United States Patent Office 3,197,410
Patented July 27, 1965

3,197,410
THERMOELECTRIC COMPOSITIONS
OF $Ta_xW_{1-x}Se_2$
Lothar H. Brixner, West Chester, Pa., assignor to E. I. du Pont de Nemours and Company, Wilmington, Del., a corporation of Delaware
No Drawing. Filed Aug. 28, 1961, Ser. No. 134,148
1 Claim. (Cl. 252—62.3)

This application is a continuation-in-part of my application Serial No. 846,461, filed October 14, 1959, and now abandoned, and Serial No. 98,293, filed March 27, 1961, and now abandoned.

This invention relates to new thermoelectric materials. Particularly it relates to new thermoelectric materials comprising at least one chalkogen selected from the group consisting of selenium and tellurium in combination with at least one metal selected from the group consisting of niobium and tantalum. In a preferred embodiment, it relates to chalkogenides comprising at least one of the elements selenium and tellurium in combination with niobium and with a heavy metal selected from the group consisting of tantalum, molybdenum and tungsten; or to a chalkogenide comprising at least one of the elements selenium and tellurium in combination with tantalum and with a heavy metal selected from the group consisting of molybdenum and tungsten.

It is an object of this invention to produce solid-solution compounds of the general formula $AB_z$, where $A$ is a member selected from the group consisting of $Nb_xTa_{1-x}$, $Nb_xMo_{1-x}$, $Nb_xW_{1-x}$, $Ta_xMo_{1-x}$ and $Ta_xW_{1-x}$, where $x$ is a positive number not greater than one, $B$ is at least one chalkogen selected from the group consisting of selenium and tellurium; and $z$ is a positive number not less than one and not greater than two.

It is also an object of the present invention to produce thermoelectric materials which are useful in devices where a Seebeck voltage (thermocurrent) is required.

It is a further object of this invention to produce thermoelectric materials which exhibit an exceptionally high Seebeck voltage at elevated temperatures, making these thermoelectric materials especially valuable for applications at such elevated temperatures.

The products of this invention can be prepared by firing under inert conditions a powdered mixture of the constituent elements in the ratio specified by the general formula given above. The duration of the firing period will vary depending upon the reactants used, the size of the charge, and the equipment used in firing. It may be stated as a general rule that firing of the powdered mixture is continued until X-ray diffraction patterns fail to disclose the characteristic lines of the starting components. The charge increases in volume during the firing and therefore the fired product should be pressed with or without comminutions, and preferably reheated to sinter it into a compact mass before being used in thermoelectric applications. The physical properties such as firmness and density are improved by the re-compacting and subsequent sintering step. Pressure molding of the chalkogenide mass prior to the sintering permits one to prepare shaped thermoelectric elements to fit the users' needs.

The compositions of this invention are suitably prepared from the elements making up the composition, but it is understood that one may start with chalkogenide compounds which are blended with one or more other ingredients to form the desired composition upon firing. The intimate mixture of the ingredients prior to firing is recommended so as to obtain uniformity in the product. A preferred operation is to subdivide the product of the first firing and then press the material into a mold of a desired shape in order to obtain the product ready for use in thermoelectric devices.

In a preferred method of preparation, the thermoelectric compositions of this invention are formed by grinding together the selected component elements. The ground mixture is then compacted into pellets and fired in an inert atmosphere at temperatures in the range of 700° C. to 900° C. The fired product is repressed into a desired shape and refired to sinter the material into a strong, coherent end-product. It is preferred to use commercially available reactants of the highest purity, and to have them in a —200 mesh (standard screen scale) particle size before firing. The products are conductors of electricity, possess thermal stability at temperatures to at least 700° C., exhibit low thermal conductivity and a large Seebeck effect. Some of the products of this invention have been found to exhibit exceptionally high Seebeck coefficients at elevated temperatures. Seebeck coefficient is calculated from measured voltage at a known temperature differential by the formula $$S = \frac{E.M.F.}{\Delta T} \times 1000$$

Also, all of the compositions have a figure of merit of at least $7.89 \times^{-7}$ °C.$^{-1}$ at 35° C., and preferred compositions have a figure of merit of at least $1 \times 10^{-4}$ °C.$^{-1}$ at 25° C. The figure of merit for thermoelectric material takes into account the fact that low resistivity and low thermal conductivity as well as high Seebeck coefficient are necessary for a good thermoelectric material. The equation for calculating the figure of merit is as follows:

$$Z(\text{figure of merit in °C.}^{-1}) = \frac{S^2}{rk}$$

where $r$ is resistivity in ohm-cm., $k$ is the thermal conductivity in watts per centimeter degree, and $S$ is the Seebeck coefficient in volts per degree centigrade.

Preferred products of this invention are materials having the composition $Ta_xW_{1-x}Se_2$ where $x$ is in the range of 0.10–0.01. Such compositions have been found to exhibit superior thermoelectric properties.

For a clearer understanding of the invention, the following specific examples are given. These examples are intended to be merely illustrative of the invention, and not in limitation thereof. All parts given are by weight.

Example 1

This example describes the preparation of TaTe. 9.0000 grams of Ta and 6.3459 grams of Te (Ta:Te atom ratio 1:1), both of —200 mesh, were mixed by ball milling in an agate mill, and the mixture compacted by a pressure of 20,000 p.s.i. into a 1" diameter pellet. This pellet was fired at 800° C. for 14 hours under Ti-Zr gettered argon. During this time, the volume of the pellet increased about 4-fold. No weight loss was encountered. The shiny crystalline reaction product obtained was pressed into a bar ¼" x ¼" x 2" and refired at 800° C. for 12 hours under argon. Again, no weight loss was detected. The X-ray pattern of the product showed no lines of the components, thereby indicating the formation of a new compound. The compound crystallized in the $D_{3d}^5$ space group, with parameters $a_0=10.904$ A. and $C_0=20.102$ A. The density of the bar was 8.04 gms. cm.$^{-3}$. The resistivity of the bar was measured by the four-point method and was found to be 1.21 milliohm-cm. Electrical energy was developed by butting the bar between two copper blocks (machined from the same piece of stock) maintained at different temperatures. Temperatures were measured at approximately the cross-sectional center of the bar immediately behind the contact faces. With a temperature differential ($\Delta T$) of 112° C. ($T_1$, 28° C., $T_2$, 140° C.), an E.M.F. of 13.5 millivolts was obtained. The Seebeck coefficient, $$\left(\frac{E.M.F.}{\Delta T} \times 1000\right)$$

was calculated from this data; this value and other electrical properties are given in Table 2.

*Example 2*

This example describes the preparation of TaTe$_2$. 6.000 grams of Ta and 8.472 grams of Te (Ta: Te atom ratio 1:2) were ground together and fired at 800° C. under gettered argon for 14 hours as described in Example 13. A considerable increase in volume resulted during this firing, with no loss in weight. X-ray analysis of the product after heating showed neither of the original components to be present. The product crystallized in the $D_{3d}^5$ space group with lattice parameters $a_0=10.904$ A. and $c_0=20.075$ A. The product was again pressed and fired in the manner described in the first example, and a crystalline, gray reaction product was obtained. The thermal conductivity ($k$) for TaTe$_2$ is 0.019 watt/cm. ° C. Tests on the material were made in the manner described in Example 1. An E.M.F. of 2.153 millivolts was obtained with a temperature differential of 124° C. ($T_1$, 30° C.; $T_2$, 154° C.). The Seebeck coefficient was calculated from this data; this value and other electrical properties are given in Table 2.

*Example 3*

This example describes the preparation of NbTe. 5.00 grams of columbium and 6.87 grams of tellurium (Nb:Te atom ratio 1:1) of −200 mesh were pressed into a 1" pellet, as in Example 1, and fired at 800° C. for 24 hours under gettered argon. As in the previous examples, the pellet increased in volume during the reaction without weight loss. Again, X-ray analysis of the cooled product failed to show any lines of the original components. The compound crystallized in the $D_{3d}^5$ space group with lattice parameters $a_0=10.904$ A. and $c_0=20.119$ A. The reaction product consisted of gray, metallic crystals. These crystals were repressed into a bar ¼" x ¼" x 2" and refired at 800° C. under purified argon for another 12 hours. During this second firing process, the bar sintered without weight loss into a strong body with a metallic luster. Tests on the material were made in the manner described in Example 1. An E.M.F. of 2.68 millivolts was obtained with a temperature differential of 116° C. ($T_1$, 28° C.; $T_2$, 144° C.). The Seebeck coefficient was calculated from this data; this value and other electrical properties are given in Table 2.

*Example 4*

This example describes the preparation of NbTe$_2$ 3.00 grams of Nb and 8.241 grams of Te (Nb:Te atom ratio 1:2) were reacted in the manner described in the previous examples, and again a gray, metallic shining product was obtained. The X-ray pattern of this product did not show any lines of the original components, thus indicating the formation of a new compound. The compound crystallized in the $D_{3d}^5$ space group with lattice parameters $a_0=10.904$ A. and $c_0=19.888$ A. Tests on the material were made in the manner described in Example 1. An E.M.F. of 1.12 millivolts was obtained with a temperature differential of 50° C. ($T_1$, 20° C.; $T_2$, 70° C.). The Seebeck coefficient was calculated from this data; this value and other electrical properties are given in Table 2.

*Example 5*

Stoichiometric quantities of the elements niobium and selenium for the formation of NbSe$_2$, 5.000 g. Nb and 8.500 g. selenium, were ground together and sealed in an evacuated quartz ampoule. The powders were of the highest purity commercially available and were of −200 (U.S. Standard Sieve) particle size. The sealed quartz ampoule was heated at 1000° C. for 12 hours. The product was found to be a gray material of metallic luster. It was reground and pressed into a bar ¼" x ¼" x 2", resealed in an evacuated quartz ampoule, and heated again for 12 hours at 1000° C. The product was examined by X-ray procedures and was found to show no lines of the starting components. The product crystallized in the $D_{6h}^4$ space group with lattice parameters $a_0=3.439$ A. and $c_0=12.998$ A.

The bar so prepared was tested for electrical properties and these are given in Table 2 below.

*Example 6*

Following the same procedure as given in Example 1, stoichiometric amounts of tantalum and selenium according to the formula TaSe$_2$, 10.000 g. Ta and 8.731 g. Se, were heated in a sealed quartz ampoule at 1000° C. for 12 hours. The product was a gray material of metallic luster of much the same appearance as the product of Example 1. This product was reground, pressed and reheated as in Example 1, and tested for electrical properties. These are given in Table 2 below. X-ray analysis of the product showed that it crystallized in the $D_{6h}^4$ space group, with lattice parameters $a_0=3.431$ A. and $c_0=12.737$ A.

*Example 7*

Following the same procedure as given in Example 1, NbSe was prepared by heating 8.0000 g. niobium and 6.7899 g. selenium in a sealed quartz ampoule at 1000° C. for 12 hours. The product was reground, repressed, and reheated for 12 hours at 1000° C., and was then tested for electrical properties. These are reported in Table 2. X-ray analysis of the product showed that it crystallized in the $D_{6h}^4$ space group with the lattice parameters $a_0=3.437$ A. and $c_0=13.030$ A.

*Example 8*

Following the same procedure as in the previous example, stoichiometric quantities of tantalum and selenium, 10.0000 g. tantalum and 4.3650 g. selenium were combined to produce TaSe. The product was tested for thermal and electrical properties, and the results are given in Table 2. X-ray analysis of the product showed that it crystallized in the $D_{6h}^4$ space group with the lattice parameters $a_0=3.425$ A. and $c_0=12.746$ A.

Example 9

The product of Example 5 was prepared in the form of single crystalline platelets with crystal edges up to 1 cm. by a transport reaction carried out in a sealed quartz tube according to the following reactions:

$$NbSe_2 + 5/2 I_2 \rightarrow NbI_5 + 2Se$$
(solid) (gas) (gas) (gas)

$$NbI_{5(g)} \rightarrow \underset{(s)}{Nb} + \underset{(g)}{5/2 I_2}$$

$$Nb_{(s)} + 2Se_{(g)} \rightarrow NbSe_{2(s)}$$

To effect these reactions, about 2 mg. $I_2$ and 10 g. NbSe$_2$ (the product of Example 5) which was ground to —200 mesh particle size, were charged into one end of a quartz tube approximately 15 mm. x 200 mm. and this tube was evacuated and sealed. The end of the tube containing the NbSe$_2$ was heated to 900° C. and the other end was heated to 700° C. These conditions were maintained for a period of 12 hours during which time a transport reaction occurred and NbSe$_2$ deposited in the cooler end of the quartz tube in the form of monocrystalline platelets. Structural data on these crystals were obtained by single crystal X-ray analysis, and results are given in Table 1, below. The identity of the transported crystals with the product obtained in Example 5 was also established with powder patterns.

Example 10

Using a procedure similar in all respects to that of Example 9 except that the charge consisted of about 2 mg. $I_2$ and 10 g. of TaSe$_2$ (the product of Example 6), single crystalline platelets of TaSe$_2$ measuring up to 1 cm. on a side were formed. For parameters and space group, see Table 1.

Example 11

Using the same procedure as in Example 9, a charge consisting of about 2 mg. of $I_2$ and 10 g. of NbTe$_2$ (the product of Example 4), was sealed in a quartz tube and heated. Single crystalline platelets of NbTe$_2$ measuring up to 1 cm. on a side were formed. Structural characteristics of these single crystals were determined by X-ray analysis and this information is given in Table 1, below.

Example 12

Using the same procedure as in Example 9, but using approximately 2 mg. of $I_2$ with 10 g. of the product of Example 2, single crystalline platelets of TaTe$_2$ were formed. Structural characteristics of these single crystals were determined by X-ray analysis, and these are summarized in Table 1, below.

TABLE 1.—STRUCTURAL CHARACTERIZATION OF THE AB$_2$ TYPE SELENIDES AND TELLURIDES OF NIOBIUM AND TANTALUM

| Compound | Space group | Parameters (A. units) |
|---|---|---|
| NbSe$_2$ | $D_{6h}^4$-P6$_3$/mmc | $a_0$=3.439, $c_0$=25.188 |
| TaSe$_2$ | $D_{6h}^4$-P6$_3$/mmc | $a_0$=3.431, $c_0$=12.737 |
| NbTe$_2$ | $D_{3d}^5$-R$\bar{3}$m | $a_0$=10.904, $c_0$=19.888 |
| TaTe$_2$ | $D_{3d}^5$-R$\bar{3}$m | $a_0$=10.904, $c_0$=20.075 |

For comparison with crystallographic data obtained on the single crystals of the compounds listed in Table 1 above, single crystals of the known compounds WTe$_2$, WSe$_2$, MoTe$_2$ and MoSe$_2$ were prepared. Space groups for these were determined as follows: WTe$_2$ crystallized in the $D_{2h}^{13}$ space group; WSe$_2$, MoTe$_2$, MoSe$_2$ all crystallized in the $D_{6h}^4$ space group. It was found that WSe$_2$, MoSe$_2$ and MoTe$_2$ crystallized in a structure which was isomorphic with TaSe$_2$. The crystal parameters were determined to be as follows: WSe$_2$: $a_0$=3.280 A., $c_0$=12.950 A.; MoSe$_2$: $a_0$=3.288 A., $c_0$=12.900 A.; MoTe$_2$: $a_0$=3.517 A., $c_0$=13.949 A. WTe$_2$ crystallized in the orthorhombic form with $a_0$=14.028 A., $b_0$=3.495 A., and $c_0$=6.240 A.

Example 13

This example describes the preparation of the compound Ta$_{0.5}$Nb$_{0.5}$Te$_2$. 3.0 grams of —200 mesh Ta powder, 1.5408 grams of —200 mesh Nb powder, and 8.466 grams of —200 mesh Te powder (Ta:Nb:Te mol ratio of 0.5:0.5:2) were carefully mixed and ball milled in a mechanical agate ball mill. The mixture was then pressed into a pellet 1 inch in diameter by a pressure of 20,000 p.s.i. The pellet was slowly heated to 800° C., at a rate of approximately 50° C. per hour under a flow of gettered argon. This reaction temperature was held for 10–12 hours, and an expanded crystalline reaction product was obtained which was cooled in the furnace. No loss of weight was detected. This reaction product, which was already homogeneous, was again ball milled and then pressed into a bar ¼" x ¼" x 2". This bar, of gray metallic appearance, was refired at 800° C. for approximately 2–4 hours and again cooled in the furnace. Again, there was no weight loss encountered during the reaction. The X-ray pattern of the product showed no lines of the components, thereby indicating compound formation. The resistivity of the bar was measured by the four-point method and was found to be 0.89 milliohm-cm. Electrical energy was developed by butting the bar between two copper blocks (machined from the same piece of stock) maintained at different temperatures. Temperatures were measured at approximately the cross-sectional center of the bar immediately behind the contact faces. An E.M.F. of 6.11 millivolts was obtained with a temperature differential of 165° C. (T$_1$, 39° C.; T$_2$, 204° C.). The Seebeck coefficient was calculated from this data; this value and resistivity data are given in Table 2.

Example 14

1.8000 grams Ta, 2.7737 grams Nb, and 10.159 grams Te were reacted in the manner described in Example 1 to form Nb$_{0.75}$Ta$_{0.25}$Te$_2$. Tests on the material were made in the manner described in Example 13. An E.M.F. of 6.17 millivolts was obtained with a temperature differential of 173° C. (T$_1$, 44° C.; T$_2$ 217° C.). The Seebeck coefficient was calculated from this data; this value and the resistivity measurement are given in Table 2.

Example 15

4.0000 grams Ta, 0.6849 gram Nb, and 7.5252 grams Te were reacted in the manner described in Example 13 to form Nb$_{0.25}$Ta$_{0.75}$Te$_2$. The thermal conductivity (k) for TaTe$_2$ is 0.031 watt/cm. ° C. By testing in the manner described in Example I, an E.M.F. of 11.32 millivolts was obtained with a temperature differential of 60° C. (T$_1$, 60° C.; T$_2$, 90° C.). The Seebeck coefficient was calculated from this data; this value and the resistivity measurement are given in Table 2.

Example 16

4.000 grams Ta, 2.0546 grams Nb, and 5.644 grams Te were reacted in the manner described in Example 13 to form Nb$_{0.5}$Ta$_{0.5}$Te. Tests on the material were made in the manner described in Example 1. An E.M.F. of 37.45 millivolts was obtained with a temperature differential of 216° C. (T$_1$, 56° C.; T$_2$ 273° C.). The Seebeck coefficient was calculated from this data; this value and resistivity data are given in Table 2.

Example 17

2.5000 grams Ta, 3.8522 grams Nb, and 7.0547 grams Te were reacted to form $Nb_{0.75}Ta_{0.25}Te$. Tests on the material were made in the manner described in Example 13. An E.M.F. of 15.6 millivolts was obtained with a temperature differential of 104° C. ($T_1$, 45° C.; $T_2$, 192° C.). The Seebeck coefficient was calculated from this data; this value and a resistivity figure are given in Table 2.

Example 18

6.000 grams Ta, 1.0273 grams Nb, and 5.644 grams Te were reacted to form $Nb_{0.25}Ta_{0.75}Te$. Tests on the material were made in the manner described in Example 13. An E.M.F. of 12.66 millivolts was obtained with a temperature differential of 110° C. ($T_1$, 38° C., $T_2$, 148° C.). The Seebeck coefficient was calculated from this data; this value and resistivity data are given in Table 2.

Example 19

Stoichiometric amounts of niobium, molybdenum, and tellurium according to the equation $$Mo + 3Nb + 8Te \rightarrow 4Nb_{0.75}Mo_{0.25}Te_2$$

were processed and tested as given in Example 13. The amounts of reactants used were:

3.003 g. Nb
1.034 g. Mo
11.000 g. Te

Electrical properties of the product are given in Table 2. The single phase nature of this product was established by X-ray analysis. The compound crystallizes in $D_{6h}^4$ type, with $a_0 = 3.591$ A. and $c_0 = 13.738$ A.

Example 20

Using the same procedure as given for Example 13, stoichiometric amounts of niobium, molybdenum, and tellurium according to the equation:

$$Mo + Nb + 4Te \rightarrow 2Nb_{0.5}Mo_{0.5}Te_2$$

were processed to a final bar.

The amounts of the elements used were: 1.820 g. niobium, 1.880 g. molydbenum, and 10.000 g. tellurium. The electrical properties of this product were tested as in Example 1 and the results are given in Table 2 below.

The single phase nature of this product was established by determining the space group and parameters in which it crystallizes. The product of this example, $Nb_{0.5}Mo_{0.5}Te_2$ crystallizes in the $D_{6h}^4$ space group with parameters $a_0 = 3.590$ A. and $c_0 = 13.786$ A.

Example 21

According to the reaction:

$$3Mo + Nb + 8Te \rightarrow 4Nb_{0.25}Mo_{0.75}Te_2$$

stoichiometric quantities of the components in powder form, weighed to the nearest milligram, were charged into a quartz ampoule. The amounts of the components used were 3.102 g. molybdenum, 1.001 g. niobium, 11.000 g. tellurium. The charged quartz ampoule was evacuated ($10^{-5}$ mm. Hg) and sealed. It was slowly heated to 900° C. and held at this temperature for 14 hours. The ampoule was then cooled, and the product removed and ground to pass at 100 mesh (U.S. Standard Sieve) screen. The powder was compacted by a pressure of 50 t.s.i. into a bar ¼" x ¼" x 2". The bar was, again sealed in a quartz ampoule and heated at 600°–700° C. for a period of 48 hours. At the conclusion of this time, the ampoule was cooled, and the bar removed from the ampoule and tested for electrical properties. The properties are given, together with those of the products of the other examples of the operation of this invention, in Table 2 which follows these examples.

The single phase nature of this product was established by determining the space group and parameters in which it crystallizes. The product of this example, $$Nb_{0.25}Mo_{0.75}Te_2$$

crystallizes in the $D_{6h}^4$ space group with parameters $a_0 = 3.557$ A. and $c_0 = 13.798$ A.

Example 22

Stoichiometric amounts of niobium, molybdenum, and tellurium according to the equation $$4Mo + Nb + 10Te \rightarrow 5Nb_{0.2}Mo_{0.8}Te_2$$

were processed in the same manner as given in Example 13 above. The weights of reactants used were 8.000 g. Nb
3.3047 g. Mo
10.987 g. Te The product was tested and properties are given in Table 2 below.

Example 23

Stoichiometric amounts of niobium, molybdenum and tellurium according to the following equation, were processed in the same manner as described in Example 13, and the resulting bar was tested for electrical properties. These are summarized in Table 2 below.

$$Nb + 9Mo + 20Te \rightarrow 10Nb_{0.1}Mo_{0.9}Te_2$$

the weights of reactants used were 0.350 g. Nb
3.253 g. Mo
9.6143 g. Te

Example 24

Following the same procedure as in the previous examples, stoichiometric quantities of reactants according to the equation $$Nb + 19Mo + 40Te \rightarrow 20Nb_{0.05}Mo_{0.95}Te_2$$

were processed to a bar which was tested for electrical properties. These are summarized in Table 2 below. The amounts of reactants used were 0.200Nb, 3.9243 g. Mo, and 10.9879 g. Te

Examples 25–28

In the same manner as is given in Example 13, products comprising the elements niobium, tungsten, and tellurium of the general formula $Nb_xW_{1-x}Te_2$ were prepared and tested for electrical properties (see Table 2). The amounts of the reactants used, which are in stoichiometric portions for the equations which were given were as follows:

| | Reaction | Weights of reactants, grams |
|---|---|---|
| Ex. 25 | $3Nb + W + 8Te \rightarrow 4Nb_{0.75}W_{0.25}Te_2$ | 3.000 g. Nb<br>1.9795 g. W<br>10.9878 g. Te |
| Ex. 26 | $Nb = W + 4Te \rightarrow 2Nb_{0.5}W_{0.5}Te_2$ | 1.500 g. Nb<br>2.9693 g. W<br>8.2408 g. Te |
| Ex. 27 | $Nb + 3W + 8Te \rightarrow 4Nb_{0.25}W_{0.75}Te_2$ | 1.000 g. Nb*<br>5.9386 g. W<br>9.8784 g. Te |
| Ex. 28 | $Nb + 9W + 20Te \rightarrow 10Nb_{0.1}W_{0.9}Te_2$ | 0.300 g. Nb<br>8.2408 g. Te<br>5.3440 g. W |

*The single phase nature of this product was established by determining the space group and parameters in which it crystallizes. The product of this example, $Nb_{0.25}W_{0.75}Te_2$ crystallizes in the $D_{2h}^{13}$ space group with parameters $a_0 = 14.081$ A., $b_0 = 3.495$ A., and $c_0 = 6.270$ A.

Examples 29–31

In the same manner as is given in Example 13 products comprising the elements tantalum, molybdenum and tellurium of the general formula $Ta_xMo_{1-x}Te$ were prepared and tested for thermal and electrical properties. The amounts of reactants used, which are in stoichiometric proportions for the equations which are given were as follows:

|  | Reaction | Weights of reactants, grams |
|---|---|---|
| Ex. 29 | $3Ta+Mo+4Te \rightarrow 4Ta_{0.75}Mo_{0.25}Te$ | 6.9095 g. Ta<br>1.222 g. Mo<br>6.500 g. Te |
| Ex. 30 | $Ta+Mo+2Te \rightarrow 2Ta_{0.5}Mo_{0.5}Te$ | 4.961 g. Ta<br>2.6316 g. Mo<br>7.000 g. Te |
| Ex. 31 | $Ta+3Mo+4Te \rightarrow 4Ta_{0.25}Mo_{0.75}Te$ | 2.6577 g. Ta<br>4.220 g. Mo<br>7.500 g. Te |

The thermal and electrical properties of these materials are given in Table 2.

Examples 32–34

In the same manner as is given in Example 13, products comprising tantalum, molybdenum, and tellurium of the general formula $Ta_xMo_{1-x}Te_2$ were prepared and tested for thermal and electrical properties. The amounts of reactants used, which are in stoichiometric proportions for the equations given, were as follows:

|  | Reaction | Weights of reactants, grams |
|---|---|---|
| Ex. 32 | $3Ta+Mo+8Te \rightarrow 4Ta_{0.75}Mo_{0.25}Te_2$ | 10.000 g. Ta<br>1.768 g. Mo<br>9.407 g. Te |
| Ex. 33 | $Ta+Mo+4Te \rightarrow 2Ta_{0.5}Mo_{0.5}Te_2$ | 5.00 g. Ta<br>2.6720 g. Mo<br>7.055 g. Te |
| Ex. 34 | $Ta+3Mo+8Te \rightarrow 4Ta_{0.25}Mo_{0.75}Te_2$ | 3.000 g. Ta<br>4.7742 g. Mo<br>8.4657 g. Te |

The thermal and electric properties of these materials are given in Table 2.

Examples 35–37

In the same manner as is given in Example 13, products comprising tantalum, tungsten, and tellurium of the general formula $Ta_xW_{1-x}Te_2$ were prepared and tested for thermal and electrical properties. The amounts of reactants used, which are in the stoichiometric proportions for the equations given, were as follows:

|  | Reaction | Weights of reactants, grams |
|---|---|---|
| Ex. 35 | $3Ta+W+8Te \rightarrow Ta_{0.75}W_{0.25}Te_2$ | 4.0000 g. Ta<br>1.3556 g. W<br>7.5253 g. Te |
| Ex. 36 | $Ta+W+4Te \rightarrow 2Ta_{0.5}W_{0.5}Te_2$ | 3.0000 g. Ta<br>3.0504 g. W<br>8.4659 g. Te |
| Ex. 37 | $Ta+3W+8Te \rightarrow 4Ta_{0.25}W_{0.75}Te_2$ | 1.500 g. Ta<br>4.5756 g. W<br>8.4659 g. Te |

The thermal and electrical properties of these materials are given in Table 2.

Example 38

This example describes the preparation of a solid-solution thermoelectric material of chemical composition $Ta_{0.25}W_{0.75}Se_{1.5}Te_{0.5}$. The procedure used in the preparation of this material was the same as that described for Example 13. The weights of tantalum, tungsten, selenium, and tellurium used were as follows:

W=6.000 g.
Ta=1.9 g.
Se=5.1518 g.
Te=2.7753 g.

The single-phase nature of this multi-component compound was established by X-ray analysis. The lines could be indexed in accordance with the $D_{3d}^5$ structure with $a_0=3.367$ A., and $c_0=19.544$ A. The electrical properties of the product of this example are given in Table 2.

Example 39

Using the same procedure as given in Example 13, a thermoelectric material of chemical composition corresponding to the formula $Ta_{0.5}W_{0.5}TeSe$ was prepared. The amounts of materials used in the preparation of this composition were:

W=4.000 g.
Ta=3.9336 g.
Te=1.5504 g.
Se=3.4344 g.

The electrical properties of this composition are given in Table 2.

To demonstrate the single phase nature of this thermoelectric composition, the lattice parameters were determined. These were found to be $a_0=3.437$ A.
$c_0=19.950$ A.

The composition $Ta_{0.5}W_{0.5}SeTe$ crystallizes in the structure $D_{3d}^5$.

Example 40

In the same manner as is given in Example 13, a thermoelectric material of composition $Ta_{0.75}W_{0.25}Te_{1.5}Se_{0.5}$ was prepared by heating together W=2.0000 g.
Ta=5.9008 g.
Te=8.3260 g.
Se=1.7173 g.

The electrical properties of this solid-solution thermoelectric material are given in Table 2, below.

The single phase nature of this composition was demonstrated by determining its lattice parameters. These were found to be $a_0=10.793$ A.
$c_0=20.153$ A.

This composition crystallizes in the $D_{3d}^5$ structure which characterizes the compound $TaTe_2$.

The compositions of Examples 38, 39, and 40 are illustrative of the fact that in the compositions of the general formula $AB_z$ described in this invention, where A is a pair of elements selected from the group consisting of $Nb_xTa_{1-x}$, $Nb_xMo_{1-x}$, $Nb_xW_{1-x}$, $Ta_xMo_{1-x}$ and $Ta_xW_{1-x}$, where $x$ is a positive number less than 1, and B is Se or Te or combination of these, substitutions of elements chosen from those listed are possible both in the cation as well as in the anion sites, these substitutions occurring either in the A and B sites, separately, or in both sites simultaneously.

Examples 41–49

In the same manner as is given in Example 13 products comprising columbium, molybdenum, and selenium; tantalum, molybdenum and selenium; and tantalum, tungsten, and selenium were prepared by using stoichiometric quantities of the reactants according to the equations given below. The products were tested for thermal and electrical properties and the results are given in Table 2, below.

Ex. 41.  $3Nb + Mo + 8S \rightarrow 4Nb_{0.75}Mo_{0.25}Se_2$  4.357 g. Nb
1.500 g. Mo
9.875 g. Se The single phase nature of this product was established by determining the space group and parameters in which it crystallizes. The product of this example, $$Nb_{0.75}Mo_{0.25}Se_2$$

crystallizes in the $D_{6h}^4$ space group with parameters $a_0 = 3.42$ A. and $c_0 = 12.65$ A.

Ex. 42.  $Nb + Mo + 4Se \rightarrow 2Nb_{0.5}Mo_{0.5}Se_2$  2.420 g. Nb
2.500 g. Mo
8.230 g. Se The single phase nature of this product was established by determining the space group and parameters in which it crystallizes. The product of this example, $$Nb_{0.5}Mo_{0.5}Se_2$$

crystallizes in the $D_{3d}^5$ space group with parameters $a_0 = 3.373$ A. and $c_0 = 19.021$ A.

Ex. 43.  $Nb + 3M + 8Se \rightarrow Nb_{0.25}Mo_{0.75}Se_2$  1.290 g. Nb
4.000 g. Mo
8.778 g. Se The single phase nature of this product was established by determining the space group and parameters in which it crystallizes. The product of this example, $$Nb_{0.25}Mo_{0.75}Se_2$$

crystallizes in the $D_{6h}^4$ space group with parameters $a_0 = 3.30$ A. and $c_0 = 12.90$ A.

Ex. 44  $3Ta + Mo + 8Se \rightarrow 4Ta_{0.75}Mo_{0.25}Se_2$  6.220 g. Ta
1.100 g. Mo
7.240 g. Se The single phase nature of this product was established by determining the space group and parameters in which it crystallizes. The product of this example, $$Ta_{0.75}Mo_{0.25}Se_2$$

crystallizes in the $D_{3d}^5$ space group with parameters $a_0 = 3.408$ A. and $c_0 = 19.132$ A.

Ex. 45.  $Ta + Mo + 4Se \rightarrow 2Ta_{0.5}Mo_{0.5}Se_2$  3.770 g. Ta
2.000 g. Mo
6.583 g. Se Ex. 46.  $Ta + 3Mo + 8Se \rightarrow 4Ta_{0.25}Mo_{0.75}Se_2$  2.199 g. Ta
3.500 g. Mo
7.681 g. Se Ex. 47.  $3Ta + W + 8Se \rightarrow 4Ta_{0.75}W_{0.25}Se_2$  2.950 g. Ta
1.000 g. W
3.434 g. Se The single phase nature of this product was established by determining the space group and parameters in which it crystallizes. The product of this example, $$Ta_{0.75}W_{0.25}Se_2$$

crystallizes in the $D_{3d}^5$ space group with parameters $a_0 = 3.408$ A. and $c_0 = 19.126$ A.

Ex. 48.  $Ta + W + 4Se \rightarrow 2Ta_{0.5}W_{0.5}Se_2$  0.983 g. Ta
1.000 g. W
1.717 g. Se The single phase nature of this product was established by determining the space group and parameters in which it crystallizes. The product of this example, $$Ta_{0.5}W_{0.5}Se_2$$

crystallizes in the $D_{3d}^5$ space group with parameters $a_0 = 3.367$ A. and $c_0 = 19.186$ A.

Ex. 49.  $Ta + 3W + 8Se \rightarrow 4Ta_{0.25}W_{0.75}Se_2$  0.328 g. Ta
1.000 g. W
1.145 g. Se The single phase nature of this product was established by determining the space group and parameters in which it crystallizes. The product of this example, $$Ta_{0.25}W_{0.75}Se_2$$

crystallizes in the $D_{6h}^4$ space group with parameters $a_0 = 3.339$ A. and $c_0 = 12.802$ A.

TABLE 2.—STRUCTURES, ELECTRICAL, AND THERMAL PROPERTIES OF SOLID-SOLUTION THERMOELECTRIC MATERIALS

| Example No. | Composition | Space group | Resistivity in milliohm-cm. (room temperature) | Seebeck coefficient in microvolts per °C. |
|---|---|---|---|---|
| 1 | TaTe | $D_{3d}^5$ | 1.21 | 121 |
| 2 | TaTe$_2$ | $D_{3d}^5$ | 0.36 | 17 |
| 3 | NbTe | $D_{3d}^5$ | 1.50 | 23 |
| 4 | NbTe$_2$ | $D_{3d}^5$ | 0.26 | 15 |
| 5 | NbSe$_2$ | $D_{6h}^4$ | 0.35 | 12 |
| 6 | TaSe$_2$ | $D_{6h}^4$ | 0.40 | 14 |
| 7 | NbSe | $D_{6h}^4$ | 1.30 | 24.7 |
| 8 | TaSe | $D_{6h}^4$ | 1.11 | 37 |
| 13 | Nb$_{0.5}$Ta$_{0.5}$Te$_2$ | | 0.89 | 37 |
| 14 | Nb$_{0.75}$Ta$_{0.25}$Te$_2$ | | 0.56 | 36 |
| 15 | Nb$_{0.25}$Ta$_{0.75}$Te$_2$ | | 7.1 | 188 |
| 16 | Nb$_{0.5}$Ta$_{0.5}$Te | | 18.8 | 173 |
| 17 | Nb$_{0.75}$Ta$_{0.25}$Te | | 3.9 | 106 |
| 18 | Nb$_{0.25}$Ta$_{0.75}$Te | | 2.3 | 115 |
| 19 | Nb$_{0.75}$Mo$_{0.25}$Te$_2$ | $D_{6h}^4$ | 1.12 | 29 |
| 20 | Nb$_{0.5}$Mo$_{0.5}$Te$_2$ | $D_{6h}^4$ | 2.78 | 60 |
| 21 | Nb$_{0.25}$Mo$_{0.75}$Te$_2$ | $D_{6h}^4$ | 16.1 | 158 |
| 22 | Nb$_{0.1}$Mo$_{0.9}$Te$_2$ | | 27.0 | 200 |
| 23 | Nb$_{0.1}$Mo$_{0.9}$Te$_2$ | | 43.5 | 220 |
| 24 | Nb$_{0.05}$Mo$_{0.95}$Te$_2$ | | 66.5 | 334 |
| 25 | Nb$_{0.75}$W$_{0.25}$Te$_2$ | | 0.729 | 25 |
| 26 | Nb$_{0.5}$W$_{0.5}$Te$_2$ | | 1.10 | 40 |
| 27 | Nb$_{0.25}$W$_{0.75}$Te$_2$ | $D_{2h}^{13}$ | 1.00 | 86 |
| 28 | Nb$_{0.1}$W$_{0.9}$Te$_2$ | | 1.17 | 100 |
| 29 | Ta$_{0.75}$Mo$_{0.25}$Te | | 1.25 | 18 |
| 30 | Ta$_{0.5}$Mo$_{0.5}$Te | | 1.57 | 7 |
| 31 | Ta$_{0.25}$Mo$_{0.75}$Te | | 4.1 | 29 |
| 32 | Ta$_{0.75}$Mo$_{0.25}$Te$_2$ | | 7.07 | 30 |
| 33 | Ta$_{0.5}$Mo$_{0.5}$Te$_2$ | | 2.09 | 60 |
| 34 | Ta$_{0.25}$Mo$_{0.75}$Te$_2$ | | 30.2 | 180 |
| 35 | Ta$_{0.75}$W$_{0.25}$Te$_2$ | | 1.40 | 80 |
| 36 | Ta$_{0.5}$W$_{0.5}$Te$_2$ | | 1.32 | 72 |
| 37 | Ta$_{0.25}$W$_{0.75}$Te$_2$ | | 1.10 | 59 |
| 38 | Ta$_{0.25}$W$_{0.75}$Se$_{1.5}$Te$_{0.5}$ | $D_{3d}^5$ | 2.5 | 50 |
| 39 | Ta$_{0.5}$W$_{0.5}$SeTe | $D_{3d}^5$ | 1.6 | 30 |
| 40 | Ta$_{0.75}$W$_{0.25}$Te$_{1.5}$Se$_{0.5}$ | $D_{3d}^5$ | 1.4 | 35 |
| 41 | Nb$_{0.75}$Mo$_{0.25}$Se$_2$ | $D_{6h}^4$ | 3.39 | 13 |
| 42 | Nb$_{0.5}$Mo$_{0.5}$Se$_2$ | $D_{3d}^5$ | 3.30 | 36 |
| 43 | Nb$_{0.25}$Mo$_{0.75}$Se$_2$ | $D_{6h}^4$ | 69.50 | 107 |
| 44 | Ta$_{0.75}$Mo$_{0.25}$Se$_2$ | $D_{3d}^5$ | 5.1 | 124 |
| 45 | Ta$_{0.5}$Mo$_{0.5}$Se$_2$ | | 14.52 | 157 |
| 46 | Ta$_{0.25}$Mo$_{0.75}$Se$_2$ | | 26.30 | 200 |
| 47 | Ta$_{0.75}$W$_{0.25}$Se$_2$ | $D_{3d}^5$ | 1.40 | 20 |
| 48 | Ta$_{0.5}$W$_{0.5}$Se$_2$ | $D_{3d}^5$ | 1.60 | 10 |
| 49 | Ta$_{0.25}$W$_{0.75}$Se$_2$ | $D_{6h}^4$ | 2.70 | 26 |

Examples 50–58

The solid solution compounds produced in Examples 19, 20, 21, 25, 26, 27, 41, 42, and 43 above were tested for thermal and electrical properties at elevated temperatures. The results of these tests are given in Table 3, below. Values for the figure of merit are also given.

TABLE 3.—THERMAL AND ELECTRICAL PROPERTIES OF SOLID SOLUTION COMPOUNDS AT ELEVATED TEMPERATURE

| Composition | Temp., °C. | Thermal conductivity K., watts/deg. cm. | Resistivity in milliohm-cm. | Seebeck coefficient in microvolts per °C. (S) | Figure of merit |
|---|---|---|---|---|---|
| $Nb_{0.75}Mo_{0.25}Te_2$ (Example 50) | 100 | Not measured | 0.65 | 28 | *6.48·10⁻⁵ |
| | 200 | ----do---- | 0.82 | 51 | 2.33·10⁻⁴ |
| | 300 | ----do---- | 0.93 | 74 | 7.69·10⁻⁴ |
| | 400 | ----do---- | 1.05 | 101 | 1.49·10⁻³ |
| | 600 | ----do---- | 1.27 | 148 | 0.89·10⁻³ |
| $Nb_{0.5}Mo_{0.5}Te_2$ (Example 51) | 100 | 0.0186 | 1.82 | 59 | 1.03·10⁻⁴ |
| | 200 | 0.0136 | 1.99 | 109 | 4.38·10⁻⁴ |
| | 300 | 0.0077 | 2.16 | 154 | 1.43·10⁻³ |
| | 400 | 0.0065 | 2.29 | 175 | 2.05·10⁻³ |
| | 600 | 0.0194 | 2.48 | 262 | 1.42·10⁻³ |
| $Nb_{0.25}Mo_{0.75}Te_2$ (Example 52) | 100 | Not measured | 22.2 | 75 | *1.41·10⁻⁵ |
| | 200 | ----do---- | 19.8 | 230 | 2.04·10⁻⁴ |
| | 300 | ----do---- | 17.5 | 460 | 1.56·10⁻³ |
| | 400 | ----do---- | 15.1 | 525 | 2.80·10⁻³ |
| | 600 | ----do---- | 12.92 | 546 | 1.19·10⁻³ |
| $Nb_{0.75}W_{0.25}Te_2$ (Example 53) | 100 | 0.0216 | 1.01 | 20 | 1.83·10⁻⁵ |
| | 200 | 0.0187 | 1.02 | 20 | 2.09·10⁻⁵ |
| | 300 | 0.0160 | 1.02 | 14 | 1.20·10⁻⁵ |
| | 400 | 0.0135 | 0.99 | 31 | 7.20·10⁻⁵ |
| | 600 | 0.0150 | 0.64 | 131 | 1.77·10⁻³ |
| $Mb_{0.5}W_{0.5}Te_2$ (Example 54) | 100 | Not measured | 1.25 | 51 | 1.15·10⁻⁴ |
| | 200 | ----do---- | 1.34 | 111 | 4.69·10⁻⁴ |
| | 300 | ----do---- | 1.40 | 159 | 8.92·10⁻⁴ |
| | 400 | ----do---- | 1.42 | 185 | 1.21·10⁻³ |
| | 600 | ----do---- | 1.43 | 192 | 1.26·10⁻³ |
| $Nb_{0.25}W_{0.75}Te_2$ (Example 55) | 100 | ----do---- | 1.76 | 52 | †7.12·10⁻⁵ |
| | 200 | ----do---- | 1.73 | 105 | 3.4·10⁻⁴ |
| | 300 | ----do---- | 1.66 | 161 | 9.75·10⁻⁴ |
| | 400 | ----do---- | 1.54 | 201 | 1.93·10⁻³ |
| | 600 | ----do---- | 1.27 | 189 | 1.86·10⁻³ |
| $Nb_{0.75}Mo_{0.25}Se_2$ (Example 56) | 100 | ----do---- | 4.36 | 8 | *7.89·10⁻⁷ |
| | 200 | ----do---- | 4.58 | 19 | 5.77·10⁻⁶ |
| | 300 | ----do---- | 4.68 | 40 | 4.45·10⁻⁵ |
| | 400 | ----do---- | 4.01 | 69 | 1.83·10⁻⁴ |
| | 600 | ----do---- | 2.39 | 108 | 2.51·10⁻⁴ |
| $Nb_{0.5}Mo_{0.5}Se_2$ (Example 57) | 100 | ----do---- | 0.78 | 58 | *3.32·10⁻⁴ |
| | 200 | ----do---- | 0.82 | 126 | 1.44·10⁻³ |
| | 300 | ----do---- | 0.88 | 168 | 4.15·10⁻³ |
| | 400 | ----do---- | 0.92 | 189 | 5.55·10⁻³ |
| | 600 | ----do---- | 0.98 | 186 | 1.82·10⁻³ |
| $Nb_{0.25}Mo_{0.75}Se_2$ (Example 58) | 100 | ----do---- | 5.65 | 64 | *4.03·10⁻⁵ |
| | 200 | ----do---- | 5.71 | 93 | 1.12·10⁻⁴ |
| | 300 | ----do---- | 5.77 | 132 | 3.95·10⁻⁴ |
| | 400 | ----do---- | 5.94 | 179 | 8.32·10⁻⁴ |
| | 600 | ----do---- | 6.63 | 301 | 7.02·10⁻⁴ |

*Figure of merit calculation based on the thermal conductivity measured for Example 51.
†Based on thermal conductivity measured for Example 53.

Examples 59–68

The products set forth in Table 4 are representative of materials having the composition $Ta_xW_{1-x}Se_2$ where $x$ is in the range of 0.10–0.01. These products were prepared by charging the elements in powder form into a quartz ampoule 15 mm. D. x 200 mm. The ampoule was evacuated and sealed off by fusion. The sealed ampoule and its contents were then placed in a furnace and heated at a rate of 100° C. per hour to 700° C., where the temperature was held for 10 to 14 hours. At the end of this period, a dark, free-flowing powder reaction product was obtained. After cooling, this product was remixed or homogenized by shaking the ampoule vigorously, but without opening it. The ampoule and its contents were then replaced in the furnace and heated gradually to 1000–1200° C., and maintained at that temperature for 10 to 14 hours. At the end of this period, a highly crystalline, metallic-looking reaction product was obtained in a free-flowing form. For characterizing measurements, the thermoelectric product was pressed into a bar as in Example 1. To form such a bar, a sufficient amount of the reaction product was weighed out, the weight determined from previous experience, and charged into a rectangular cavity in a steel die, the cavity measuring 2″ long by ¼″ wide. This die was placed on the bed of a press, with the long dimension of the rectangular cavity in the horizontal plane, and the die plunger, measuring 2″ long by ¼″ wide brought down vertically with a pressure of 40 to 50 tons per sq. in. thus compressing the crystalline powder to a rectangular bar measuring 2″ long by ¼″ wide by ¼″ thick, this third dimension having been predetermined by the weight of reaction product charged to the die for a given press force. The rectangular bar had a density 90% of theoretical, or, of the density determined by X-ray structural determinations. The electrical properties, that is, the resistivity and Seebeck coefficient were measured in the direction of the long dimension of the rectangular bar, as in Example 1.

TABLE 4

| Example No. | Composition | Resistivity in milliohm-cm. at 25° C. | Seebeck coefficient in microvolts per °C. at 25° C. | Lattice parameters* | |
|---|---|---|---|---|---|
| | | | | $a_0$ | $c_0$ |
| 59 | $Ta_{0.10}W_{0.90}Se_2$ 0.8742 g. Ta 8.0000 g. W 7.6323 b. Se | 1.10 | 33 | 3.301 | 12.9 |
| 60 | $Ta_{0.09}W_{0.91}Se_2$ 0.7781 g. Ta 8.0000 g. W 7.5484 g. Se | 1.10 | 36 | -------- | -------- |
| 61 | $Ta_{0.08}W_{0.92}Se_2$ 0.6842 g. Ta 8.0000 g. W 7.4664 g. Se | 1.15 | 39 | 3.301 | 12.908 |
| 62 | $Ta_{0.07}W_{0.93}Se_2$ 0.5922 g. Ta 8.0000 g.W 7.3861 g.Se | 1.23 | 44 | 3.298 | 12.912 |
| 63 | $Ta_{0.06}W_{0.94}Se_2$ 0.6842 g.Ta 8.0000 g.W 7.4664 g.Se | 1.40 | 48 | 3.297 | 12.920 |
| 64 | $Ta_{0.05}W_{0.95}Se_2$ 0.4141 g.Ta 8.0000 g.W 7.2308 g.Se | 1.49 | 56 | 3.295 | 12.923 |
| 65 | $Ta_{0.04}W_{0.96}Se_2$ 0.3278 g.Ta 8.0000 g.W 7.1553 g.Se | 1.70 | 65 | 3.293 | 12.928 |
| 66 | $Ta_{0.025}W_{0.975}Se_2$ 0.2269 g.Ta 9.0000 g.W 7.9250 g.Se | 3.50 | 90 | 3.291 | 12.941 |

TABLE 4—Continued

| Example No. | Composition | Resistivity in milliohm-cm. at 25° C. | Seebeck coefficient in microvolts per ° C. at 25° C. | Lattice parameters* | |
|---|---|---|---|---|---|
| | | | | $a_0$ | $c_0$ |
| 67 | $Ta_{0.02}W_{0.98}Se_2$ 0.1806 g.Ta 9.0000 g.W 7.8854 g.Se | 4.50 | 100 | 3.291 | 12.945 |
| 68 | $Ta_{0.015}W_{0.985}Se_2$ 0.1348 g.Ta 9.0000 g.W 7.8454 g.Se | 5.70 | 110 | 3.291 | 12.950 |

*All of the products in this table are single-phase solid solutions which crystallize in the $D_{6h}^4$ structure of $MoSe_2$.

*Examples 69–70*

The procedure and methods of measurement used in these examples were the same as those described in Examples 59–68. Thermal conductivity measurements were also made as in Examples 50–58 by a modification of the method of Francl and Kingery, J. Am. Ceram. Soc. 37, 80 (1954). This method requires a cylindrical specimen 0.75 in. D. x 1 in. high which was prepared by pressing. A weighed amount of the free-flowing reaction product was charged into a cylindrical cavity in a steel die, the die placed in a press with axis of the cylindrical cavity vertical, and the other member of the die brought down so as to compress the reaction product into a 0.75 in. D. x 1 in. cylinder, the height being predetermined by the weight of product charged to the die cavity. According to the Francl and Kingery procedure, the thermal conductivity was measured in the direction of the cylinder axis. The data on the compositions and their properties are given in Table 5.

TABLE 5

| Example No. | Composition | Resistivity in milliohm—cm. | | Seebeck coefficient, $\mu V./deg.^{-1}$ | | Thermal conductivity, watts/cm.$^{-1}$ deg.$^{-1}$ | | Fig. of merit, deg.$^{-1}$ | |
|---|---|---|---|---|---|---|---|---|---|
| | | 25° C. | 600 °C. | 25° C. | 600° C. | 25° C. | 600° C. | 25° C. | 600 ° C. |
| 69 | $Ta_{0.03}W_{0.97}Se_2$ 0.2585 g.Ta 8.5000 g.W 7.5241 g.Se | 1.90 | 2.10 | 75 | 182 | 0.21 | 0.007 | $1.41 \cdot 10^{-4}$ | $2.2 \cdot 10^{-3}$ |
| 70 | $Ta_{0.01}W_{0.99}Se_2$ 0.4141 g.Ta 8.0000 g.W 7.2308 g.Se | 6.90 | 7.45 | 120 | 347 | 0.21 | 0.007 | $0.99 \cdot 10^{-4}$ | $2.3 \cdot 10^{-3}$ |

The compounds of Examples 69 and 70 are single-phase solid solutions which crystallize in the $D_{6h}^4$ structure of $MoSe_2$. The structural parameters are as follows:

| | $a_0$ | $c_0$ |
|---|---|---|
| $Ta_{0.03}W_{0.97}Se_2$ | 3.292 | 12.938 |
| $Ta_{0.01}W_{0.99}Se_2$ | 3.288 | 12.966 |

The examples given above are representative of compositions which may be made according to this invention. However, many other variations are also possible. For example, one might prepare a composition midway between that of Examples 31 and 34 which would have the composition represented by the empirical formula $Ta_{0.25}Mo_{0.75}Te_{1.5}$. In a similar manner, compositions intermediate between those of other examples can also be prepared.

The products produced in this invention are the result of chemical reaction. In the simplest embodiment of the invention, from the standpoint of composition, the product may be represented by the formula $AB_z$ where A is either tantalum or niobium, B is either tellurium or selenium, and $z$ is in the range of 1 to 2. Products of this formula are chemical compounds, and they are formed directly by firing Element A with Element B in such proportions that there is present one atom of A for every one to two atoms of B. For example, when a mixture of tantalum and tellurium containing one atom of tantalum for every atom of tellurium is fired, there is formed the chemical compound, tantalum monotelluride (TaTe). In instances where the amount of selenium or tellurium used is such that $z$ in the empirical formula $AB_z$ is not an integer, the product behaves according to well-known principles of solid state physics, to form a compound having a defect structure. When a portion of the niobium or tantalum is replaced by a substitute metal, as heretofore specified, the product of this invention is a solid solution of the telluride or selenide of niobium or tantalum with the telluride or selenide of the substitute metal. Generally speaking, the systems containing two metals usually have better thermoelectric properties than those made up of only one metal in combination with selenium and/or tellurium. Moreover, investigation has indicated that these better thermoelectric properties may be obtained when as little as 5 atom percent of the second metal is present. As previously mentioned, it is also possible to use a combination of selenium and tellurium in preparing the compositions of this invention. Such a combination forms solid solutions of tellurides and selenides of the metal or metals used.

The addition of "doping" agents, such as is practiced in semi-conductor fields of technology, may also be practiced in connection with this invention. These "doping" reagents are usually added in minute quantities and are useful in developing special effects, usually an enhancement of the value of the product insofar as its major property is concerned. It is contemplated that such additions may be made to my thermoelectric compositions, but the product will contain as essential elements at least one metal selected from the group consisting of niobium and tantalum, and at least one chalkogen from the group consisting of selenium and tellurium.

The compositions of this invention are useful in generating electric current directly from thermal energy without reliance upon mechanical parts. Thermoelectric generators are well known in the art, and thermoelectric elements of a size and shape to fit any particular generator can be prepared from the compositions of this invention by compacting these compositions into the desired size and shape prior to final firing. Also, the compositions described herein can be used in thermoelectric cooling devices.

Since it is obvious that many changes and modifications can be made in the above-described details without departing from the nature and spirit of the invention, it is to be understood that the invention is not to be limited to said details except as set forth in the appended claim.

The embodiments of the invention in which an exclusive property or privilege is claimed are defined as follows:

Thermoelectric compositions consisting essentially of tantalum, tungsten, and selenium in the proportions represented by the formula $Ta_xW_{1-x}Se_2$ where x is in the range of 0.10–0.01.

References Cited by the Examiner

FOREIGN PATENTS 794,982    5/58    Great Britain.

OTHER REFERENCES

Ariya, S. M., Zaslavsky, A. I. and Matveeva, I. I.: The Chemistry of Compounds of Variable Composition, IV; the tantalum-selenium system, J. Gen. Chem. USSR, vol. 26 (1956), pages 2651–3.

Chemical Abstracts, vol. 50, 1956, page 16250(e).

Kovba, L. M. (3-phase of the tantalum-tellurium system), ibid. vol. 4, 1959, pages 2820–2822.

Ukrainskiy, Yu. M., Novoselovia, A. V., and Simanov, Yu. P.: Investigation of the Tantalum-Tellurium System; (in Russian) Issledovaniye sistemy tantal-tellur., "Zhurnal Neorganicheskoi Khimii, vol. 4, No. 1, 1959, pages 148–152.

WINSTON A. DOUGLAS, *Primary Examiner.*

JOHN H. MACK, *Examiner.*